United States Patent [19]

Isowa et al.

[11] 3,862,110

[45] Jan. 21, 1975

[54] LINEAR OLIGOPEPTIDES USEFUL FOR THE PRODUCTION OF DEFERRI-FERRICHROME AND FERRICHROME

[75] Inventors: Yoshikazu Isowa, Tokyo; Toshiyuki Takashima, Ebina; Muneki Ohmori, Sagamihara; Mideaki Kurita, Sagamihara; Masanari Sato, Sagamihara; Kaoru Mori, Sagamihara, all of Japan

[73] Assignee: Sagami Chemical Research Center, Tokyo, Japan

[22] Filed: Apr. 20, 1972

[21] Appl. No.: 246,022

[30] Foreign Application Priority Data
| | | |
|---|---|---|
| Apr. 20, 1971 | Japan | 46-24909 |
| Apr. 22, 1971 | Japan | 46-25673 |
| Apr. 23, 1971 | Japan | 46-26065 |
| Apr. 23, 1971 | Japan | 46-26066 |
| Apr. 23, 1971 | Japan | 46-26067 |
| June 9, 1971 | Japan | 46-40125 |

[52] U.S. Cl. .............................. 260/112.5, 424/177
[51] Int. Cl. ..................... C07c 103/52, C08h 1/00, A61k 27/00
[58] Field of Search ................................. 260/112.5

[56] References Cited
UNITED STATES PATENTS
3,326,885    6/1967    Prelog ............................. 260/112.5

OTHER PUBLICATIONS
Rogers et al., Biochemistry, 3, 1850 (1964).
Keller–Schierlein et al., Helv. Chim. Acta, 52, 603 (1969).

*Primary Examiner*—Lewis Gotts
*Assistant Examiner*—Reginald J. Suyat
*Attorney, Agent, or Firm*—Sughrue, Rothwell, Mion, Zinn & Macpeak

[57] ABSTRACT

Novel linear oligopeptides and process for the production thereof are disclosed. These oligopeptides are useful as intermediates for the production of deferri-ferrichrome.

17 Claims, No Drawings

LINEAR OLIGOPEPTIDES USEFUL FOR THE PRODUCTION OF DEFERRI-FERRICHROME AND FERRICHROME

This invention relates to novel linear oligopeptides and a process for preparing them, said linear oligopeptides being represented by the general formula:

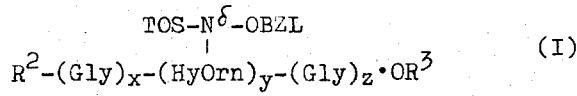   (I)

wherein $x + y + z$ is an integer of 3 to 6, inclusive; $x$ is equal to 0 or 1; $y$ is an integer of 1 to 3, inclusive; $z$ is zero or an integer of 2 to 3, inclusive; "Gly" represents a glycine residual group;

" 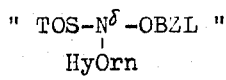 "
HyOrn represents the group

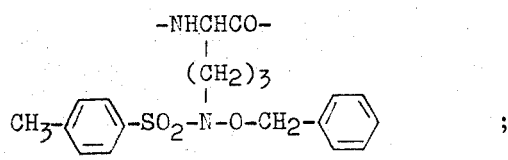 ;

$R^2$ is selected from the group consisting of hydrogen and a protecting group for the amino group; $R^3$ is selected from the group consisting of hydrogen and a protecting group for the carboxy group. The oligopeptides according to this invention are useful as intermediates for the production of deferri-ferrichrome and ferrichrome. Thus, deferri-ferrichrome can be produced by cyclizing a linear hexapeptide of the above general formula wherein $x + y + z = 6$ with the aid of a condensing agent, removing the protecting group for the hydroxyamino group and acetylating the cyclization product. Ferrichrome can then be produced by reacting the thus obtained deferri-ferrichrome with a trivalent iron salt.

Ferrichrome is a compound of considerable importance as a growth factor for microorganisms and, as such, can be used advantageously in the cultivation of microorganisms (see, British Patent Specification No. 1,029,737). Ferrichrome is also known to be useful as an antianemic agent or a therapeutic agent for the treatment of haematic disorders, as disclosed in German Patent No. 439,586 and British Patent Specification No. 1,011,558.

It is not simply that the linear oligopeptides according to this invention oligopeptide be used for the production of ferrichrome which has the above-described important application but it has been found that, with the linear oligopeptides of this invention, ferrichrome can be produced more easily and expediently than by any of the methods heretofore proposed Helvetica Chimica Acta, 52, 603 (1969).

The object oligopeptide this invention is therefore to provide a novel linear oligopeptid which may serve as the skeletal structure of ferrichrome.

Another object of this invention is to provide a process for preparing such a novel linear oligopeptide.

A further object of this invention is to provide novel tripeptides, tetrapeptides, pentapeptides and hexapeptides represented by the above general formula.

Referring to the above general formula, the linear oligopeptides of this invention can be classified into: tripeptides ($x + y + z = 3$); tetrapeptides ($x + y + z = 4$); pentapeptides ($x + y + z = 5$); and hexapeptides ($x + y + z = 6$). Examples of compounds which can be represented by the above general formula include:

$N^\delta$-Tosyl-$N^\delta$-benzyloxy-L-ornithylglycylglycine
Di-$N^\delta$-tosyl-$N^\delta$-benzyloxy-L-ornithyl-$N^\delta$-tosyl-$N^\delta$-benzyloxy-L-ornithine
Di-$N^\delta$-tosyl-$N^\delta$-benzyloxy-L-ornithylglycylglycine
$N^\delta$-Tosyl-$N^\delta$-benzyloxy-L-ornithyldiglycylglycine
Tri-$N^\delta$-tosyl-$N^\delta$-benzyloxy-L-ornithylglycylglycine
Di-$N^\delta$-tosyl-$N^\delta$-benzyloxy-L-ornithyldiglycylglycine
Tri-$N^\delta$-tosyl-$N^\delta$-benzyloxy-L-ornithyldiglycylglycine
Glycyltri-$N^\delta$-tosyl-$N^\delta$-benzyloxy-L-ornithylglycylglycine While the foregoing compounds are free peptides, the corresponding compounds having their α-amino and/or carboxyl groups protected, as well as the acid addition salts thereof, also fall within the scope of this invention. The protecting group for the amino or carboxyl group as referred to in this specification means any of the groups heretofore established for the protection of α-amino groups in the field of peptide synthesis, such as carbobenzoxy, t-butoxycarbonyl, p-methoxybenzyloxycarbonyl, etc., or any of the groups known for the protection of carboxyl groups, such as alkyl group.

The linear oligopeptides according to the present invention can be prepared in the manner described hereinafter. Generally, the process of this invention is clasified into two processes, one is referred to as the stepwise elongation method, and other is referred to as the fragment condenstion method. These methods can be represented by the following schemes:

Stepwise Elongation Method

Stepwise Elongation Method (A)

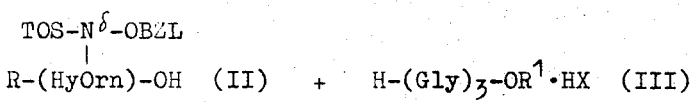

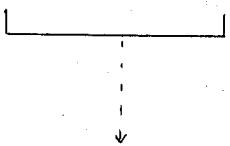

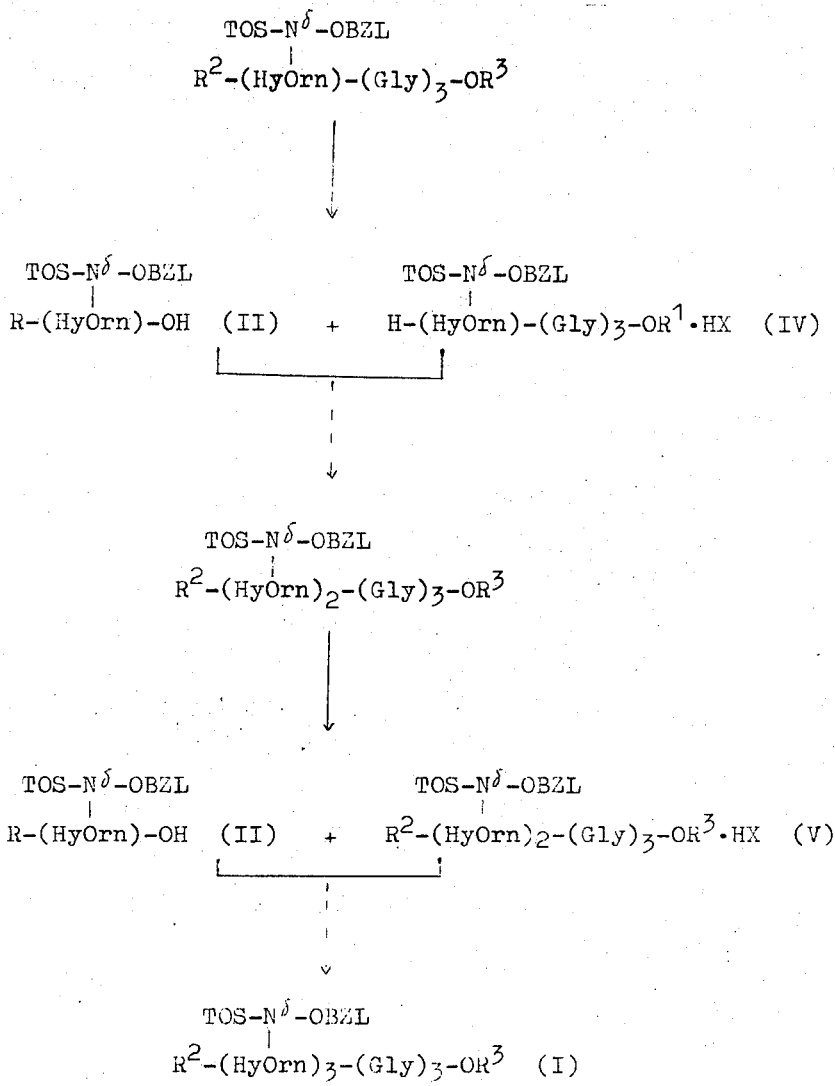
(B)
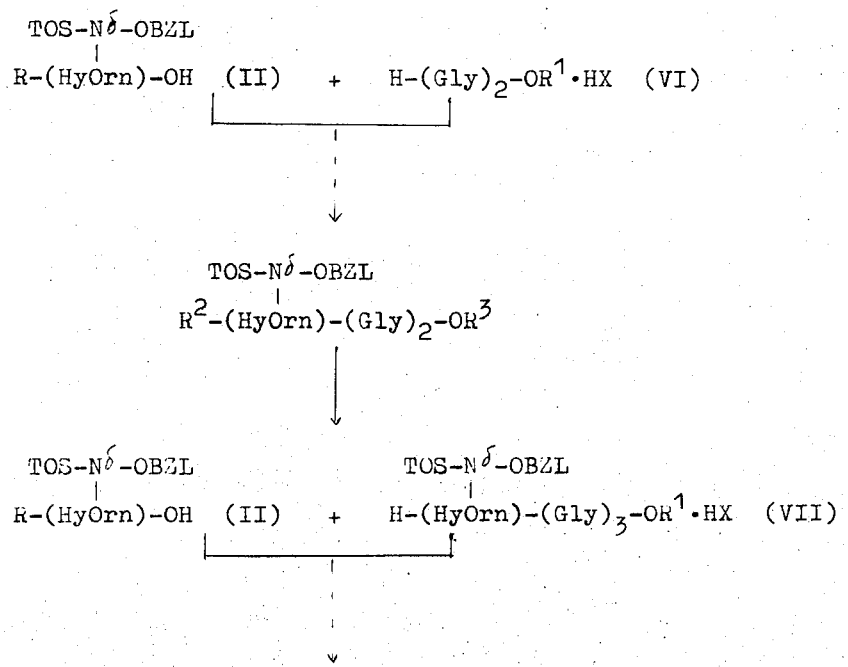

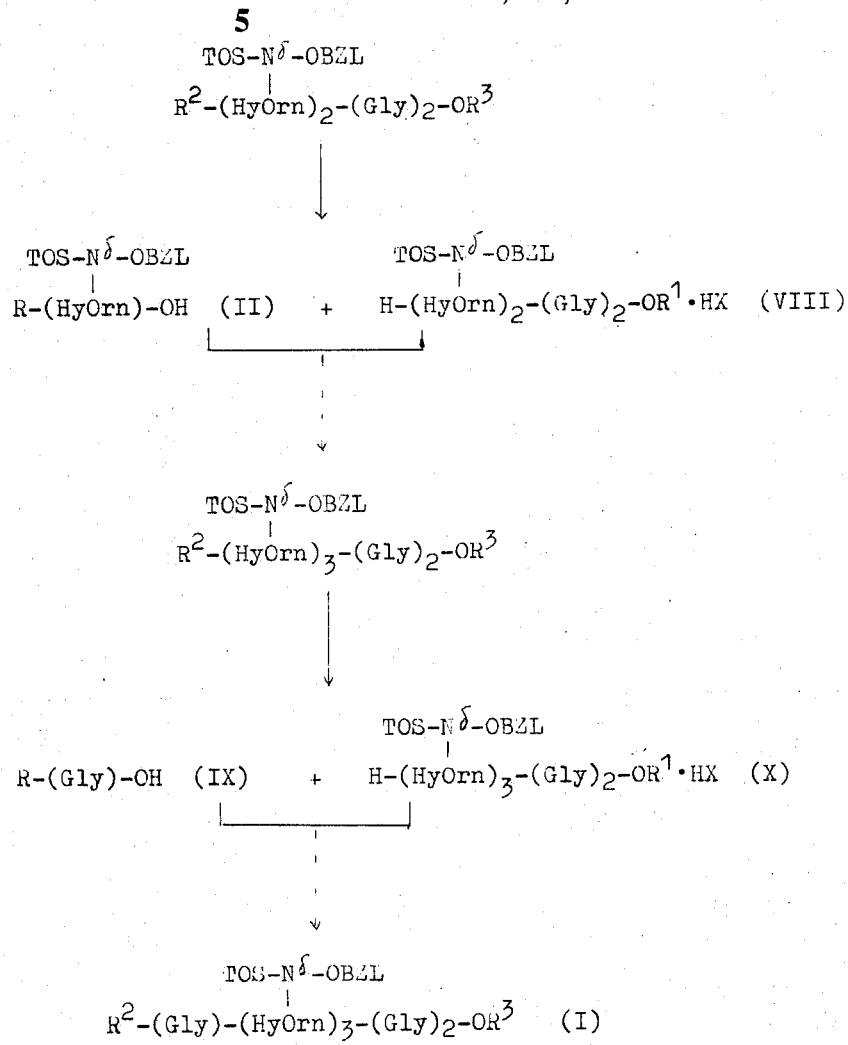

Fragment Condensation Method

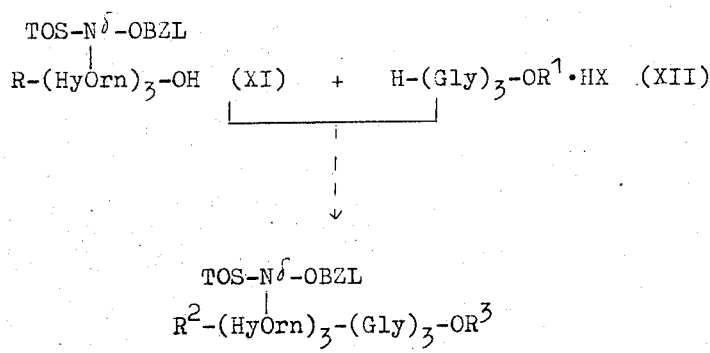

In the above reaction schemes, "Gly" represents a glycine residual group;

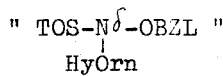

represents the group

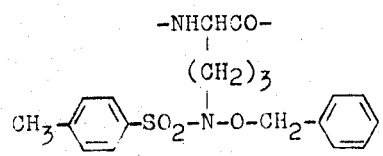

R represents a protecting group or the amino group; $R^1$ represents a protecting group or the carboxy group; $R^2$ is selected from the group consisting of hydrogen and a protecting group for the amino group; and $R^3$ is selected from the group consisting of hydrogen and a protecting group for the carboxy group. The symbol ↓ stands for the reaction step which may include the removal of the protecting group.

In the stepwise elongation method (A), the starting material, $N^\delta$-tosyl-$N^\delta$-benzyloxy-L-ornithine having its α-amino group protected with a protecting group (II), can be derived from $N^\delta$-tosyl-$N^\delta$-benzyloxyornithine which is, in turn, obtainable by hydrolysis of the α-acylamino-ω-(O,N-disubstituted-hydroxyamino)-alkylmalonic acid ester disclosed in Japanese Patent Publication No. 24763/1970 proposed by the present inventors. More specifically, the starting material (II) can be produced by first subjecting the above $N^\delta$-tosyl-$N^\delta$-benzyloxy-DL-ornithine to optical resolution to obtain the corresponding L-amino acid and then protecting the α-amino group of the L-amino acid with an appropriate protecting group. Another starting material, diglycylglycine alkyl ester hydrohalides, is a known compound commonly employed in the peptide synthesis and is commercially available.

The reactions between the ornithine compound (II) and the compound (III), (IV) or (V) are coupling reactions which can be carried out in the same manner in each instance at room temperature in the presence of an inert solvent such as tetrahydrofuran, dimethylformamide or the like. The reaction is usually completed within about 10 to 50 hours. The coupling agent commonly employed in the carbodiimide method, mixed acid anhydride method and Woodward method can advantageously be used in the above reactions, and it includes, for example, dicyclohexylcarbodiimide and Woodward reagents, especially, Woodward reagent K (N-ethyl-5-phenylisooxazolium-3'-sulfonate).

In the stepwise elongation method (B), the starting material (VI), i.e. an alkyl ester of glycylglycine, can be prepared by any one of the known procedures. For example, the ester (VI) can be obtained by the phosphoazo method, e.g., by reacting a glycine alkyl ester hydrochloride with a protected glycine. The reactions between the compound (II) and the compound (VI), (VII) or (VIII), as well as the reaction between the glycine having its α-amino group protected with a protecting group (IX) and the compound (X) can be carried out in an inert solvent such as nitromethane, terahydrofuran or the like in the presence of a coupling agent as described in Method (A) and a neutralizing agent, for example, triethylamine, N-alkylmorpholine or the like. These reactions ae carried out at a temperature in the range of from 0°C to about room temperature for about 24 to 48 hours. The reactants are preferably used in an equimolar amount in each instance.

In the fragment condensation method, the starting material, di-$N^\delta$-tosyl-$N^\delta$-benzyloxy-L-ornithyl-$N^\delta$-tosyl-$N^\delta$-benzyloxy-L-ornithine having its α-amino group protected with a protecting group can easily be obtained by reacting $N^\delta$-tosyl-$N^\delta$-benzyloxy-L-ornithyl-$N^\delta$-tosyl-$N^\delta$-benzyloxy-L-ornithine having its α-amino group protected with a protecting group, with an $N^\delta$-tosyl-$N^\delta$-benzyloxy-L-ornithine alkyl ester. The thus obtained compound (XI) can then be reacted with an alkyl ester of diglycylglycine (XII) in an appropriate solvent such as nitromethane, tetrahydrofuran, dioxane or dimethylformamide in the presence of a coupling agent such as dicyclohexyl-carbodimide plus N-hydroxysuccinimide or Woodward reagent to produce the desired hexapeptides (I). The reaction can be carried out at a temperature in the range of from 0°C to room temperature using an equimolar amount of the reactants (XI) and (XII).

In the process of this invention, the removal of the protecting group from the tripeptides, tetrapeptides, pentapeptides and hexapeptides can be carried out by any one of the conventional procedures which are known in the peptide synthesis. For example, the removal of the protecting group can be carried out in any reaction stage by using hydrogen chloride and dioxane or ethyl acetate or by catalytic reduction.

The term "alkyl ester" used throughout the specification and claims of this invention means protecting group for the ester bond known in the peptide synthesis and it includes such groups as methyl, ethyl, benzyl and nitrobenzyl.

The present invention is further illustrated by the following examples, but they are not to be construed as limiting the scope of the invention.

EXAMPLE 1

A solution of 7.43 g of dicyclohexylcarbodiimide in 80 ml of dimethylformamide was added to a solution of 17.15 g of $N^\delta$-t-tutyloxycarbonyl-$N^\delta$-tosyl-$N^\delta$-benzyloxy-L-ornithine, 10.40 g of diglycylglycine ethyl ester hydrobromide, 8.05 g of N-hydroxysuccinimide and 3.98 ml of N-methylmorpholine in 370 ml of dimethylformamide at −10°C. The mixture was stirred at room temperature for 48 hour, and the solvent was removed under reduced pressure. Water was added to the resulting oily residue which was then solidified by scratching. The product was recovered by filtration and washed successively with 10% aqueous citric acid, 3% aqueous sodium bicarbonate and watr. Recrystallization from ethyl acetate-ligroin yielded 20.0 g of $N^\alpha$-t-butyloxycarbonyl-$N^\delta$-tosyl-$N^\delta$-benzyloxy-L-ornithyldiglycylglycine ethyl ester having a melting point of 90° – 102°C. Yield, 83.0%.

Analysis

|  | C | H | N |
|---|---|---|---|
| Calcd. for $C_{32}H_{45}O_{10}N_5S$: | 55.55; | 6.56; | 10.12 |
| Found: | 55.94; | 6.43; | 10.19 |

EXAMPLE 2

18 g of $N^\alpha$-t-butyloxycarbonyl-$N^\delta$-tosyl-$N^\delta$-benzyloxy-L-ornithyldiglycylglycine ethyl ester was suspended in a mixture of 100 ml of 6.3N hydrochloric acid in ethyl acetate and 50 ml of ethyl acetate, and the suspension was allowed to stand for 2 hours at room temperature. The resulting solution was then evaporated under reduced pressure, and the residual oil was diluted with 200 ml of ether. The product was recovered by filtration, washed with ether to give 15.8 g of $N^\delta$-tosyl-$N^\delta$-benzyloxy-L-ornithyldiglycylglycine ethyl ester hydrochloride having a melting point of 115° – 128°C, $[\alpha]_D^{25} + 21.7°$ (c=1, in methanol). Yield, 96.8%.

EXAMPLE 3

Following a procedure similar to that described in Example 1, but using 16.8 g of $N^\delta$-tosyl-$N^\delta$-benzyloxy-L-ornithyldiglycylglycine methyl ester hydrochloride (prepared in Example 2) and 13.1 g of $N^\alpha$-t-butyloxycarbonyl-$N^\delta$-tosyl-$N^\delta$-benzyloxy-L-ornithine, there was obtained 20.8 g of $N^\alpha$-t-butyloxycarbonyl-di-$N^\delta$-tosyl-$N^\delta$-benzyloxy-L-ornithyldiglycylglycine ethyl ester having a melting point of 155° – 157°C after recrystallization from hot methanol.

Analysis

|  | C | H | N |
|---|---|---|---|
| Calcd. for $C_{51}H_{67}N_7O_{14}S_2$: | 57.45; | 6.33; | 9.20 |
| Found: | 57.50; | 6.05; | 9.08 |

EXAMPLE 4

$N^\alpha$-t-butyloxycarbonyl-di-$N^\delta$-tosyl-$N^\delta$-benzyloxy-L-ornithyldiglycylglycine ethyl ester prepared in Example 3 was subjected to removal of the protecting group at $N^\alpha$-position in the same manner as Example 2 to give i-$N^\delta$-tosyl-$N^\delta$-benzyloxy-L-ornithyldiglycylglycine ethyl ester hydrochloride having a melting point of 196° – 201°C, $[\alpha]_D^{25} + 17.9°$ (c=1, in methanol). Yield, 98.2%.

EXAMPLE 5

Following a procedure similar to that described in Example 2, but using 18.6 g of di-N $^\delta$-tosyl-N $^\delta$-benzyloxy-L-ornithyldiglycylglycine ethyl ester hydrochloride (prepared in Example 4) and 9.09 g of N $^\alpha$-t-butyloxycarbonyl-N $^\delta$-tosyl-N $^\delta$-benzyloxy-L-ornithine, there was obtained 24.6 g of N $^\alpha$-t-butyloxycarbonyl-tri-N $^\delta$-tosyl-N $^\delta$-benzyloxy-L-ornithyldiglcylglycine ethyl ester having a melting point of 192° – 195°C after recrystallization from hot methanol and $[\alpha]_D^{25}$ − 5.2° (c=1, methanol).

Anaylsis

| | C | H | N |
|---|---|---|---|
| Calcd. for $C_{70}H_{89}N_9O_{18}S_3$: | 58.35; | 6.23; | 8.75 |
| Found: | 58.49; | 6.09; | 8.67 |

EXAMPLE 6

40 ml of 1N sodium hydroxide was added to a suspension of 18.5 g of N $^\alpha$-t-butyloxycarbonyl-tri-N $^\delta$-tosyl-N $^\delta$-benzyloxy-L-ornithyldiglycylglycine ethyl ester in 250 ml of acetone. The mixture was then allowed to stand for 2 days whereby the product was saponified, after which time the mixture was made acidic with citric acid and the solvent was evaporated under reduced pressure. The precipitated oily product was then solidified by scratching at a temperature of 0° – 5°C. The product was recovered by filtration and washed with water to give 17.4 g of N $^\alpha$-t-butyloxycarbonyl-tri-N $^\delta$-tosyl-N $^\delta$-benzyloxy-L-ornithyldiglycylglycine having a melting point of 122° – 129°C, $[\alpha]_D^{25}$ − 2.0 (c=1, in methanol. Yield, 96.3%.

Analysis

| | C | H | N |
|---|---|---|---|
| Calcd. for $C_{68}H_{85}N_9O_{18}S_3$: | 57.81; | 6.07; | 8.92 |
| Found: | 57.94; | 6.09; | 8.87 |

EXAMPLE 7

Following a procedure similar to that described in Example 2, N $^\alpha$-t-butyloxycarbonyl-tri-N $^\delta$-tosyl-N $^\delta$-benzyloxy-L-ornithyldiglycylglycine (prepared in Example 6) was subjected to removal of the protecting group at N $^\alpha$-position. The resulting hydrochloride was then treated with ammonia in dimethylformamide, and the product was recrystallized from acetic acid-water to give tri-N $^\delta$-tosyl-N $^\delta$-benzyloxy-L-ornithyldiglcylglycine having a melting point of 257° – 260°C (decomposition), $[\alpha]_D^{25}$ + 3.6° (c=1, in methanol). Yield, 55.2%.

| | C | H | N |
|---|---|---|---|
| Calcd. for $C_{63}H_{77}N_9O_{16}S_3$: | 57.65; | 5.91; | 9.61 |
| Found: | 57.78; | 5.82; | 9.52 |

EXAMPLE 8

To a suspension of 9.86 of N $^\alpha$-t-butoxycarbonyl-N $^\delta$-tosyl-N $^\delta$-benzyloxy-L-ornithine and 5.07 g of Woodward reagent K in 80 ml of nitromethane, there was added 2.93 ml of triethylamine at a temperature of 5°C. The mixture was stirred in an ice-water bath for 4 hours or until a clear solution was obtained. Then, to this solution was added 4.54 g of glycylglycine methyl ester hydrobromide and 2.93 ml of triethylamine at a temperature of 5°C. The reaction mixture was stirred at room temperature for 36 hours, after which time the solution was evaporated in vacuo at a temperature of 50°C. The resulting oily residue was extracted with chloroform. The organic layer was washed once with water, 3 times with M-sodium bicarbonate solution and further three times with 1N hydrochloric acid, and finally once with water. It was then dried over magnesium sulfate and evaporated to dryness. The residue was crystallized from a small amount of ethyl acetate with the addition of petroleum ether to give 10.5 g of N $^\alpha$-t-butoxycarbonyl-N $^\delta$-tosyl-N $^\delta$-benzyloxy-L-ornithylglycylglycine methyl ester. yield, 84.7%; $[\alpha]_D^{25}$ + 7.0 (c=1, MeOH).

Analysis

| | C | H | N |
|---|---|---|---|
| Calcd. for $C_{29}H_{40}N_4O_9S$: | 56.11; | 6.50; | 9.03 |
| Found: | 56.35; | 6.68; | 8.91 |

EXAMPLE 9

To a suspension of 22.0 g of N $^\alpha$-t-butoxycarbonyl-N $^\delta$-tosyl-N $^\delta$-benzyloxy-L-ornithylglycylglycine methyl ester in 90 ml of ethyl acetate, there was added 236 ml of 3.0N hydrogen chloride in ethyl acetate. The solution was allowed to stand at room temperature for 2 hours, after which time it was evaporated in vacuo. The resulting oil was crystallized from a small amount of ethyl acetate with the addition of absolute ether to give 18.0 g of N $^\delta$-tosyl-N $^\delta$-benzyloxy-L-ornithylglycylglycine methyl ester hydrochloride having a melting point of 138° – 142°C. Yield, 91.4%; $[\alpha]_D^{25}$ + 23.6 (c=1, in ethanol).

| | C | H | N |
|---|---|---|---|
| Calcd. for $C_{24}H_{33}N_4O_7SCl$: | 51.74; | 5.97; | 10.06 |
| Found: | 51.67; | 6.16; | 9.94. |

EXAMPLE 10

A suspension of 5.01 g of N $^\alpha$-carbobenzoxy-N $^\delta$-tosyl-N $^\delta$-benzyloxy-L-ornithine and 1.33 ml of triethylamine in 47.5 ml of tetrahydrofuran was cooled to a temperature in the range of −10° to −15°C, followed by the addition of 1.28 ml of isobutyl chlorocarbonate. The mixture was stirred for 12 minutes, at the end of which time a suspension of 2.16 g of glycylglycine methyl ester hydrobromide and 1.33 ml of triethylamine in 20 ml of dimethylformamide was added. The mixture was stirred in an ice-water bath for 1 hour and at room temperature for 15 hours. The reaction mixture was concentrated under reduced pressure and water was added to the concentrate. The resulting oil was extracted with ethyl acetate and washed continuously with water, 1N hydrochloric acid, water, 1/2M aqueous solution of sodium bicarbonate and water in the order mentioned. It was then dried over anhydrous sodium sulfate and evaporated to dryness to give crystals of N $^\alpha$-carbobenzoxy-N $^\delta$-tosyl-N $^\delta$-benzyloxy-L-ornithylglycylglycine methyl ester. Yield, 88%.

EXAMPLE 11

To a suspension of 13.8 g of N $^\alpha$-t-butoxycarbonyl-N $^\delta$-tosyl-N $^\delta$-benzyloxy-L-ornithine and 7.2 g of Woodward reagent K in 100 ml of nitromethane, there was added 4.18 ml of triethylamine. The mixture was stirred in an ice-water bath for 4 hours or until a clear solution was obtained. Then, 15.6 g of N $^\delta$-tosyl-N $^\delta$-benzyloxy-L-ornithylglycylglycine methyl ester hydrochloride and 4.18 ml of triethylamine were added. The mixture was stirred at room temperature for 36 hours, after which time it was evaporated in vacuo at a temperature of 50°C to obtain an oil. With the addition of water, the oil was crystallized from a small amount of dimethylformamide to give 27.2 g of N$^\alpha$-t-butoxycarbonyl-di-N$^\delta$-tosyl-N$^\delta$-benzyloxy-L-ornithygly-cylglycine methyl ester. Yield, 97.6%; $[\alpha]_D^{25}$ +2.5 (c=1, in methanol).
Analysis

|  | C | H | N |
|---|---|---|---|
| Calcd. for C$_{48}$H$_{62}$O$_{13}$N$_6$S$_2$: | 57.93; | 6.28; | 8.45 |
| Found: | 57.84; | 6.31; | 8.25 |

EXAMPLE 12

To a suspension of 28 g of N$^\alpha$-t-butoxycarbonyl-di-N$^\delta$-tosyl-N$^\delta$-benzyloxy-L-ornithylglycyglycine methyl ester in 100 ml of ethyl acetate, there was added 80 ml of 5.7N hydrogen chloride in ethyl acetate. The mixture was allowed to stand at room temperature for 2 hours, at the end of which time it was evaporated in vacuo to obtain an oil. Then, with the addition of absolute ether, the oil was crystallized from a small amount of ethyl acetate to give di-N$^\delta$-tosyl-N$^\delta$-benzyloxy-L-ornithylglycylglycine methyl ester hydrochloride having a melting point of 112° – 120°C. Yield, 98%; $[\alpha]_D^{25}$ + 16.0 (c=1, in methanol).
Analysis

|  | C | H | N |
|---|---|---|---|
| Calcd. for C$_{43}$H$_{55}$O$_{11}$N$_6$S$_2$Cl: | 55.44; | 5.95; | 9.02 |
| Found: | 55.22; | 6.17; | 8.92 |

EXAMPLE 13

A suspension of 4.40 g of N$^\alpha$-carbobenzoxy-N$^\delta$-tosyl-N$^\delta$-benzyloxy-L-ornithine and 1.17 ml of triethylamine in 42 ml of tetrahydrofuran was cooled to about −10°C and 1.13 ml of isobutyl chlorocarbonate was added thereto. The mixture was stirred for 20 minutes. To the resulting solution was added a suspension of 5.04 g of N$^\delta$-tosyl-N$^\delta$-benzyloxy-L-ornithylglycylglycine methyl ester hydrochloride and 1.17 ml of triethylamine in 15 ml of dimethylformamide. The mixture was stirred in an ice-water bath for 1 hour and at room temperature for 15 hours. Then, the reaction mixture was concentrated under reduced pressure and water was added to the concentrate, whereupon an oil was obtained. This oil was extracted with ethyl acetate and the extract was washed with water, 1N hydrochloric acid, water, 1/2M sodium bicarbonate solution and water in the order mentioned and, finally evaporated to dryness to give N$^\delta$-carbobenzoxy-di-N$^\delta$-tosyl-N$^\delta$-benzyloxy-L-orrnithylglycylglycine methyl ester -benzyloxy-L-ornithylglycylglycine a solid. Yield, 89%.

EXAMPLE 14

To a suspension of 10.2 g of N$^\alpha$-t-butoxycarbonyl-N$^\delta$-tosyl-N$^\delta$-benzyloxy-L-ornithine and 5.2 g of Woodward reagent K in 80 ml of nitromethane, there was added 3.3ml of triethylamine. The mixture was stirred in an ice-water bath for 4 hours or until a clear solution was obtained. To this solution was added 19.2 g of di-N$^\delta$-tosyl-N$^\delta$-benzyloxy-L-ornithylglycylglycine methyl ester hydrochloride and 3.3 ml of triethylamine. The mixture was stirred at room temperature for 36 hours, after which time it was evaporated in vacuo at a temperature of 50°C. The resulting oil was crystallized from a small amount of dimethylformamide with the addition of water to give 27.8 g of N$^\alpha$-t-butoxycarbonyl-tri-N$^\delta$-tosyl-N$^\delta$-benzyloxy-L-ornithylglycylglycine methyl ester having a melting point of 138° – 154°C. Yield, 98%; $[\alpha]_D^{25}$ + 1.8 (c=1, in methanol).

Analysis

|  | C | H | N |
|---|---|---|---|
| Calcd. for C$_{67}$H$_{84}$O$_{17}$N$_6$S$_3$: | 58.75; | 6.18; | 8.18 |
| Found: | 58.81; | 5.97; | 7.93 |

EXAMPLE 15

To a suspension of 28.4 g of N$^\alpha$-t-tuboxycarbonyl-tri-N$^\delta$-tosyl-N$^\delta$-benzyloxy-L-ornithylglycyglycine methyl ester in 100 ml of ethyl acetate, there was added 100 ml of 5.7N hydrogen chloride in ethyl acetate. The solution was allowed to stand at room temperature for 3 hours, after which time it was evaporated in vacuo to obtain an oil. With the addition of absolute ether, the oil was crystallized from a small amount of ethyl acetate to give 26.4 g of tri-N$^\delta$-tosyl-N$^\delta$-benzyloxy-L-ornithylglycylglycine methyl ester hydrochloride having a melting point of 116° – 119°C. Yield, 98.1%; $[\alpha]_D^{25}$ + 9.2 (c=1, in methanol).
Analysis

|  | C | H | N |
|---|---|---|---|
| Calcd. for C$_{62}$H$_{77}$O$_{15}$S$_3$Cl: | 57.02; | 5.94; | 8.53 |
| Found: | 56.52; | 6.05; | 8.23 |

EXAMPLE 16

A suspension of 4.40 g of N$^\alpha$-carbobenzoxy-N$^\delta$-tosyl-N$^\delta$-benzyloxy-L-ornithine and 1.17 ml of triethylamine in 40 ml of tetrahydrofuran was cooled to about −10°C, followed by the addition of 1.13 ml of isobutyl chlorocarbonate. The mixture was stirred for 15 minutes, after which time a suspension of 8.15 g of di-N$^\delta$-tosyl-N$^\delta$-benzyloxy-L-ornithylglycylglycine methyl ester hydrochloride and 1.17 ml of triethylamine in 15 ml of dimethylformamide was added. The mixture was stirred in an ice-water bath for 1 hour and at room temperature for 15 hours. The reaction mixture was concentrated under reduced pressure and water was added to the concentrate, thereupon an oil was obtained. This oil was extracted with ethyl acetate and the extract was washed with water, 1N hydrochloric acid, water, ½M aqueous solution of sodium bicarbonate and water in the order mentioned and, finally evaporated to dryness to give crystals of N$^\alpha$-carbobenzoxy-tri-N$^\delta$-toxyl-N$^\delta$-benzyloxy-L-ornithylglycylglycine methyl ester. Yield, 80%.
Analysis

|  | C | H | N |
|---|---|---|---|
| Calcd. for C$_{70}$H$_{82}$N$_8$O$_{17}$S$_3$: | 59.90; | 5.89; | 7.98 |
| Found: | 59.84; | 6.17; | 8.03 |

EXAMPLE 17

3.24 g of N$^\alpha$-carbobenzoxy-tri-N$^\delta$-toxyl-N$^\delta$-benzyloxy-L-ornithylglycylglycine methyl ester was treated with 4.7 ml of 20% hydrogen bromide in acetic acid at room temperature for 2 hours and the resulting oil was crystallized from methanol-ethanol to give tri-N$^\delta$-toxyl-N$^\delta$-benzyloxy-L-ornithylglycylglycine methyl ester hydrobromide. Yield, 92%; melting point, 131° – 134°C.
Analysis

|  | C | H | N |
|---|---|---|---|
| Calcd. for C$_{62}$H$_{77}$N$_8$O$_{15}$S$_3$Br: | 55.14; | 5.75; | 8.38 |
| Found: | 55.07; | 5.69; | 8.28 |

EXAMPLE 18

To a suspension of 3.52 g of t-tuboxycarbonylglycine and 5.1 g of Woodward reagent K in 160 ml of nitromethane, there was added 3.0 ml of triethylamine, and the mixture was stirred in an ice-water bath for 3 hours or until a clear solution was obtained. To this solution was added 26.3 g of tri-N$^\delta$-tosyl-N$^\delta$-benzyloxy-L-ornithylglycylglycine methyl ester hydrochloride and 3.0 ml of triethylamine. The reaction mixture was stirred at room temperature for 36 hours, after which time the solution was evaporated in vacuo (20 mmHg) at a temperature of 50°C. Finally, water was added to the residue, whereupon 26.7 g of N$^\alpha$-t-butoxycarbonylglycyl-tri-N$^\delta$-tosyl-N$^\delta$-benzyloxy-L-ornithylglycylglycine methyl ester was obtained. Yield, 95%; $[\alpha]_D^{25}$ + 2.3 ($c$=1, in CHCl$_3$).
Analysis

|  | C | H | N |
|---|---|---|---|
| Calcd. for C$_{69}$H$_{87}$N$_9$O$_{18}$S$_3$: | 58.08; | 6.15; | 8.84 |
| Found: | 57.94; | 6.11; | 8.74 |

EXAMPLE 19

22.02 g of N$^\alpha$-t-butoxycarbonylglycyl-tri-N$^\delta$-tosyl-N$^\delta$-benzyloxy-L-ornithylglycylglycine methyl ester was suspended in 150 ml of acetone, followed by the addition of 20 ml of 1N sodium hydroxide. The mixture was stirred at room temperature for 2 hours, after which time it was adjusted to pH 4 with 1M citric acid solution. The mixture was then concentrated under reduced pressure to obtain a crystalline product. This product was recrystallized from methanol-ether to give 16.2 g of N$^\alpha$-t-butoxycarbonylglycyl-tri-N$^\delta$-toxyl-N$^\delta$-benzyloxy-L-ornithylglycylglycine having a melting point of 146° – 158°C. Yield, 74.5%; $[\alpha]_D^{25}$ + 19.3 ($c$=1, in chloroform).
Analysis

|  | C | H | N |
|---|---|---|---|
| Calcd. for C$_{68}$H$_{87}$N$_9$O$_{18}$S$_3$: | 57.81; | 6.07; | 8.92 |
| Found: | 57.56; | 5.88; | 8.66 |

EXAMPLE 20

10.0 g of N$^\alpha$-t-butoxycarbonylglycyl-tri-N$^\delta$-tosyl-N$^\delta$-benzyloxy-L-ornithyl-glycyglycine was suspended in 60 ml of ethyl acetate, and 60 ml of 5.7N hydrochloric acid-ethyl acetate was added to the suspension. The mixture was allowed to stand at room temperature for 4 hours. The resulting solution was then evaporated in vacuo, and 20 ml of ether was added to the residue to give 9.4 g of crystals of glycyl-tri-N$^\delta$-tosyl-N$^\delta$-benzyloxy-L-ornithyl-glycylglycine hydrochloride. Yield, 98.2%; m.p., 122° – 148°C; $[\alpha]_D^{25}$ − 3.2 ($c$=1, in methanol).
Analysis

|  | C | H | N |
|---|---|---|---|
| Calcd. for C$_{63}$H$_{78}$N$_9$O$_{16}$S$_3$Cl: | 56.09; | 5.83; | 9.35 |
| Found: | 55.94; | 6.06; | 9.10 |

EXAMPLE 21

9.58 g of glycyl-tri-N$^\delta$-tosyl-N$^\delta$-benzyloxy-L-ornithylglycylglycine hydrochloride was dissolved in 60 ml of dimethylformamide, and 20 ml of 10% aqueous ammonia was added to the solution. The mixture was stirred at room temperature for 2 hours, after which time it was concentrated under reduced pressure (20 mmHg). Water was added to the concentrate, whereupon 8.6 g of free glycyl-tri-N$^\delta$-tosyl-N$^\delta$-benzyloxy-L-ornithylglycyglycine was obtained. Yield, 92.2%; m.p., 212° – 218°C; $[\alpha]_D^{25}$ − 5.6 ($c$=0.5, in acetic acid).
Analysis

|  | C | H | N |
|---|---|---|---|
| Calcd. for C$_{63}$H$_{77}$N$_9$O$_{16}$S$_3$: | 57.65; | 5.91; | 9.61 |
| Found: | 57.34; | 5.80; | 9.30 |

EXAMPLE 22

A suspension of 0.494 g of p-methoxybenzyloxycarbonylglycine and 0.289 ml of triethylamine in 10 ml of tetrahydrofuran was cooled to a temperature of about −10°C and 0.279 ml of isobutylchlorocarbonate was added. The mixture was stirred for 20 minutes. A suspension of 2.78 g of tri-N$^\delta$-tosyl-N$^\delta$-benzyloxy-L-ornithylglycylglycine methyl ester hydrobromide and 0.289 ml of triethylamine in 10 ml of dimethylformamide was added to the above mixture, and the resulting mixture was stirred in an ice-water bath for 1 hour and at room temperature for 15 hours. The reaction mixture was then concentrated under reduced pressure, and water was added to the concentrate, whereupon an oil was obtained. This oil was extracted with ethyl acetate and the extract was washed successively with water, 1N hydrochloric acid, water, 1/2M sodium bicarbonate solution and water. It was dried over anhydrous sodium sulfate and evaporated to dryness to obtain N$^\alpha$-p-methoxybenzyloxycarbonyl-glycyl-tri-N$^\delta$-tosyl-N$^\delta$-benzyloxy-L-ornithylglycylglycine methyl ester having a melting point of 168° – 171°C. Yield, 70%
Analysis

|  |  |  |
|---|---|---|
| Calcd. for C$_{73}$H$_{87}$N$_9$O$_{19}$S$_3$: | C, 58.81; | H, 5.88; |
|  | N, 8.46; | S, 6.45 |
| Found: | C, 58.89; | H, 5.71; |
|  | N, 8.32; | S, 6.55 |

EXAMPLE 23

To a solution of 2.37 g of N$^\alpha$-carbobenzoxy-N$^\delta$-tosyl-N$^\delta$-benzyloxy-L-ornithyl-N$^\delta$-tosyl-N$^\delta$-benzyloxy-L-ornithine methyl ester in 11 ml of dioxane, there was added 1.56 ml of 2N sodium hydroxide. The mixture was stirred at a temperature of 10°C for 3 hours and at room temperature for 1 hour whereby the ester was saponified. Under cooling, the solution was adjusted to pH 2–3 with 1N hydrochloric acid and concentrated under reduced pressure. The concentrate was extracted with ethyl acetate. The organic layer was washed with water and dried over anhydrous sodium sulfate. After filtration, the filtrate was evaporated to dryness to obtain 2.03 g of semi-solid N$^\alpha$-carbobenzoxy-N$^\delta$-tosyl-N$^\delta$-benzyloxy-L-ornithyl-N$^\delta$-tosyl-N$^\delta$-benzyloxy-L-ornithine. Yield, 86%.
Analysis Calcd. for C$_{46}$H$_{52}$N$_4$O$_{11}$S$_2$: N, 6.05
Found: N, 6.03

EXAMPLE 24

0.34 ml of triethylamine was added to a suspension of 2.03 g of N$^\alpha$-carbobenzoxy-N$^\delta$-tosyl-N$^\delta$-benzyloxy-L-ornithyl-N$^\delta$-tosyl-N$^\delta$-benzyloxy-L-ornithine and a solution (0.57g/7ml) of Woodward reagent K in dimethylformamide which had been previously cooled to 5°C. At 5°C, the mixture was stirred for 2 hours, after which time 1.01 g of N$^\delta$-tosyl-N$^\delta$-benzyloxy-L-ornithyl methyl ester hydrochloride and a mixture of 0.34 ml of triethylamine and 1 ml of dimethylformamide were added thereto. The mixture was then stirred at room temperature for 20 hours and evaporated under reduced pressure. Water was added to the residue and the resulting precipitate was recovered, washed successively with 1N hydrochloric acid, water, 0.5M sodium bicarbonate and water, and finally dried. Recrystallization from methanol yielded 1.6 g of N$^\alpha$-carbobenzoxy-di-N$^\delta$-tosyl-N$^\delta$-benzyloxy-L-ornithyl-N$^\delta$-tosyl-N$^\delta$-benzyloxy-L-ornithine methyl ester, m.p., 121° – 133°C; $[\alpha]_D^{25}$ – 0.9 (c=2, in $CH_3COOC_2H_5$).
Analysis

|  | C | H | N |
|---|---|---|---|
| Calcd. for $C_{66}H_{76}N_6O_{15}S_3$: | 61.47; | 5.94; | 6.52 |
| Found: | 60.68; | 5.81; | 6.43 |

EXAMPLE 25

Following a procedure similar to that described in Example 23, 14.5 g of N$^\alpha$-carbobenzoxy-di-N$^\delta$-tosyl-N$^\delta$-benzyloxy-L-ornithyl-N$^\delta$-tosyl-N$^\delta$-benzyloxy-L-ornithine was obtained from 1.48 g of the N$^\alpha$-carbobenzoxy-di-N$^\delta$-tosyl-N$^\delta$-benzyloxy-L-ornithyl-N$^\delta$-tosyl-N$^\delta$-benzyloxy-L-ornithine methyl ester prepared in Example 24. Recrystallization from methanol yielded 1.28 g of pure crystalline product. Yield, 85%; m.p., 139° – 146°C.
Analysis

| Calcd. for $C_{65}H_{74}N_6O_{15}S_3$: | C, 61.20; | H, 5.85; |
|---|---|---|
|  | N, 6.59; | S. 7.54 |
| Found: | C, 61.24; | H, 5.98; |
|  | N, 6.78; | S, 7.55 |

EXAMPLE 26

1.765 g of N$^\alpha$-t-tuboxycarbonyl-N$^\delta$-tosyl-N$^\delta$-benzyloxy-L-ornithine and 0.908 g of Woodward reagent K were suspended in 20 ml of nitromethane. The suspension was cooled in an ice-water bath and 0.55 ml of triethylamine was added dropwise thereto. After 30 minutes; the mixture was allowed to return to room temperature and stirred until a homogeneous system was obtained. The solution was cooled with icewater again, and 2.93 g of N$^\delta$-tosyl-N$^\delta$-benzyloxy-L-ornithine-N$^\delta$-tosyl-N$^\delta$-benzyloxy-L-ornithine methyl ester was added followed by the addition of 0.55 ml of triethylamine. The resulting mixture was stirred at room temperature for 36 hours. The reaction mixture was then concentrated at a temperature of less than 50°C and, after the addition of a small amount of dimethylformamide, was concentrated again. The concentrate was triturated with water to obtain crystals. The crystals were recovered by filtration and thoroughly washed successively with water, 1N hydrochloric acid and 1M sodium bicarbonate. Recrystallization from ethyl acetate-petroleum ether yielded 4.26 g of N$^\alpha$-t-butoxycarbonyl-di-N$^\delta$-tosyl-N$^\delta$-benzyloxy-L-ornithyl-N$^\delta$-tosyl-N$^\delta$-benzyloxy-L-ornithine methyl ester. Yield, 94.87%; m.p., 110° – 118°C; $[\alpha]_D^{25}$ – 1.3 (c=1, in AcOEt); $[\alpha]_D^{25}$ ± 0 (c=1, in MeOH).
Analysis

|  | C | H | N |
|---|---|---|---|
| Calcd. for $C_{68}H_{78}O_{15}N_6S_3$: | 60.26; | 6.26; | 6.69 |
| Found: | 59.92; | 6.54; | 6.42 |

EXAMPLE 27

2.33 g of N$^\alpha$-t-butyloxycarbonyl-di-N$^\delta$-tosyl-N$^\delta$-benzyloxy-L-ornithyl-N$^\delta$-tosyl-N$^\delta$-benzyloxy-L-ornithine methyl ester was dissolved in 13 ml of ethyl acetate, followed by the addition of 13 ml of 5.8N hydrochloric acid-ethyl acetate. With occasional shaking, the mixture was allowed to stand at room temperature for 2 hours. The reaction mixture was concentrated and the concentrate was dissolved in a small amount of absolute methanol, followed by the addition of absolute ether. The oily precipitate was triturated and the resulting crystals were recovered by filtration, washed with absolute ether and dried. Recrystallization from methanol-ether yielded 1.96 g of di-N$^\delta$-tosyl-N$^\delta$-benzyloxy-L-ornithyl-N$^\delta$-tosyl-N$^\delta$-benzyloxy-L-hydroxyornithine methyl ester hydrochloride. Yield, 88.47%; m.p., 97° – 102°C; $[\alpha]_D^{25}$ + 8.1 (c=1, in methanol).
Analysis

|  | C | H | N |
|---|---|---|---|
| Calcd. for $C_{58}H_{71}O_{13}N_6S_3Cl$: | 58.44; | 6.00; | 7.05 |
| Found: | 58.90; | 5.99; | 6.76 |

EXAMPLE 28

A suspension of 4.47 g of N$^\alpha$-carbobenzoxy-di-N$^\delta$-tosyl-N$^\delta$-benzyloxy-L-hydroxyornithyl-N$^\delta$-tosyl-N$^\delta$-benzyloxy-L-ornithine and 0.89 g of N-ethyl-5-phenylisooxazolium-3'-sulfonate (Woodward reagent K) in 14 ml of dimethylformamide was cooled to 0° – 5°C and 0.536 ml of triethylamine was added thereto. The mixture was stirred until a homogeneous solution is obtained. To this solution was added a mixed solution of 0.84 g diglycylglycine methyl ester hydrochloride and 0.536 ml of triethylamine in 3.5 ml of dimethylformamide, and the mixture was stirred at a temperature of 0° – 5°C for 1 hour and at room temperature for 20 hours. The reaction mixture was evaporated under reduced pressure and water was added to the residue. The mixture was triturated to obtain a solid. After filtration, the solid was washed with water, 1N hydrochloric acid, water, 0.5M aqueous solution of sodium bicarbonate and water in the order mentioned, followed by drying over phosphoric anhydride. Recrystallization from methanol yielded 3.35 g of colorless amorphous crystals of N$^\alpha$-carbobenzoxy-tri-N$^\delta$-tosyl-N$^\delta$-benzyloxy-L-ornithyldiglycylglycine methyl ester. Yield, 65.5%; melting point, 181° – 184°C; $[\alpha]_D^{25}$ – 2.9 (c=2, in $CH_3COOH$).
Analysis

| Calcd. for $C_{72}H_{85}N_9O_{18}S_3$: | C, 59.20; | H, 5.87; |
|---|---|---|

```
                    N, 8.63;      S, 6.57
           Found: C, 59.27;       H, 5.88;
                    N, 8.74;      S, 6.66
```

For the purpose of comparison, the D,D,D-isomer was prepared in the same manner. This isomer had the following properties:
Melting point, 181° – 189°C
$[\alpha]_D^{25} + 3.1$ ($c=2$, $CH_3COOH$)
Analysis

```
Calcd. for C₇₂H₈₅N₉O₁₈S₃:  C, 59.20;   H, 5.87;
                           N, 8.63;    S, 6.57
             Found:        C, 58.68;   H, 5.76;
                           N, 8.64;    S, 6.75
```

EXAMPLE 29

A suspension of 1.46 g of N$^\alpha$-carbobenzoxy-tri-N$^\delta$-tosyl-N$^\delta$-benzyloxy-L-ornithyldiglycyglycine methyl ester in 4.2 ml of dioxane was cooled to 0° – 5°C and, then, 0.6 ml of a 2N aqueous solution of sodium hydroxide was added thereto. The mixture was then stirred for 3.5 hours at room temperature, and the reaction mixture was cooled again, adjusted to pH 2 with 1N hydrochloric acid and evaporated under reduced pressure. The residue was triturated to obtain a solid. The solid was recovered by filtration, washed with water and dried over phosphoric anhydride. Recrystallization from ethanol yielded 1.22 g of colorless amorphous crystals of N$^\alpha$-carbobenzoxy-tri-N$^\delta$-tosyl-N$^\delta$-benzyloxy-L-ornithyldiglycylglycine. Yield, 84.2%; melting point, 159° – 162°C; $[\alpha]_D^{25} - 3.2$ ($c=2$, in $CH_3COOH$).
Analysis

```
Calcd. for C₇₁H₈₃N₉O₁₈S₃:  C, 58.94;   H, 5.78;
                           N, 8.71;    S, 6.65
             Found:        C, 59.01;   H, 5.74;
                           N, 8.82;    S, 6.52
```

For the purpose of comparison, the D,D,D-isomer was prepared in the same manner. This isomer had the folowing properties:
Melting point, 159° – 164°C
$[\alpha]_D^{25} + 2.9$ ($c=1.98$, in $CH_3COOH$)

EXAMPLE 30

1.45 g of N$^\alpha$-carbobenzoxy-tri-N$^\delta$-tosyl-N-$^\delta$-benzyloxy-L-ornithyldiglycylglycine was treated with 6 ml of a solution (20g/100 ml) of hydrogen bromide-acetic acid at room temperature for 3 hours. This reaction mixture was evaporated under reduced pressure at a temperature of 40°C. The residue was triturated with 0.25M aqueous solution of sodium bicarbonate. The resulting solid was recovered by filtration, washed with water and dried over phosphoric anhydride. It was then dissolved in a small amount of dimethylformamide, followed by the addition of a large volume of ethanol, whereupon colorless linear crystals separated. The crystals were recovered by filtration, washed with ethanol and ether and, finally, dried over phosphoric anhydride to give 0.93 g of tri-N$^\delta$-tosyl-N$^\delta$-benzyloxy-L-ornithyldiglycylglycine. Yield, 71%; melting point, 224° – 233°C (decomposition); $[\alpha]_D^{25} + 5.3$ ($c=1$ in $CH_3COOH$).
Analysis

```
Calcd. for C₆₃H₇₇N₉O₁₆S₃:  C, 57.65;   H, 5.91;
                           N, 9.61;    S, 7.33
             Found:        C, 57.55;   H, 5.92;
                           N, 9.60;    S, 7.34
```

For the purpose of comparison, the corresponding D,D,D-isomer was prepared in the same manner. This isomer had the following properties:
Melting point, 225° – 235°C (decomposition)
$[\alpha]_D^{25} - 5.6$ ($c=0.66$, in $CH_3COOH$)

What we claim is:

1. A linear oligopeptide represented by the formula

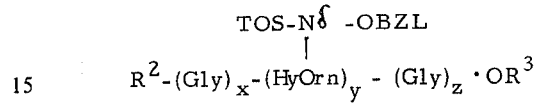

wherein $x + y + z$ is an integer of 3 to 6, inclusive; z is equal to 0 or 1, y is an integer of 1 to 3, inclusive; z is zero or an integer of 2 to 3, inclusive; "Gly" represents a gylcine residual group;

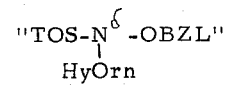

represents the group

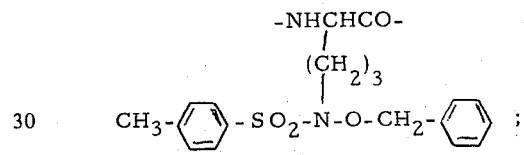

$R^2$ is selected from the group consisting of hydrogen and a protecting group for the amino group selected from the group consisting of the acyl groups t-butyloxycarbonyl, p-methoxybenzyloxycarbonyl, and carbobenzoxy; $R^3$ is selected from the group consisting of hydrogen and a protecting group for the carboxy group selected from the group consisting of methyl and ethyl, and acid addition salt thereof.

2. N$^\delta$-Tosyl-N$^\delta$-benzyloxy-L-ornithylglycylglycine.
3. Di-N$^\delta$-tosyl-N$^\delta$-benzyloxy-L-ornithyl-N$^\delta$-tosy-N$^\delta$-benzyloxy-L-ornithine.
4. Di-N$^\delta$-tosyl-N$^\delta$-benzyloxy-L-ornithylglycylglycine.
5. N$^\delta$-Tosyl-N$^\delta$-benzyloxy-L-ornithyldiglycylglycine.
6. Tri-N$^\delta$-tosyl-N$^\delta$-benzyloxy-L-ornithylglycylglycine.
7. Di-N$^\delta$-tosyl-N$^\delta$-benzyloxy-L-ornithyldiglycylglycine.
8. Tri-N$^\delta$-tosyl-N$^\delta$-benzyloxy-L-ornithyldiglycylglycine.
9. Glycyltri-N$^\delta$-tosyl-N$^\delta$-benzyloxy-L-ornithylglycylglycine.
10. A process for preparing a linear oligopeptide of the formula

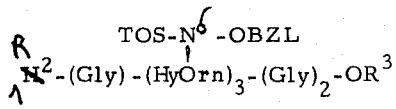

wherein "Gly" represents a glycine residual group;

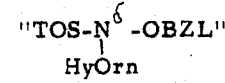

represents the group

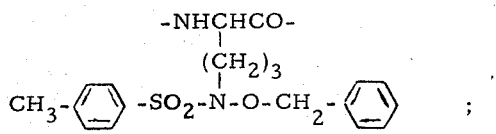

$R^2$ is selected from the group consisting of hydrogen and a protecting group for the amino group selected from the group consisting of the acyl groups t-butyloxycarbonyl, p-methoxybenzyloxycarbonyl and carbobenzoxy; $R^3$ is selected from the group consisting of hydrogen and a protecting group for the carboxy group selected from the group consisting of alkyl groups methyl and ethyl, and the acid addition salt thereof, which comprises coupling at a temperature of 0°C to about room temperature glycine having its α-amino group protected with the protecting group, with an ornithine compound of the formula

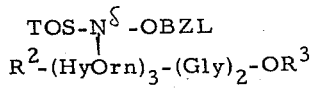

wherein

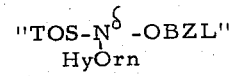

"Gly," $R^2$ and $R^3$ are as defined above, using as a coupling agent dicyclohexylcarbodiimide plus N-hydroxysuccinimide or Woodward Reagent K and, if desired, removing the protecting group from the resulting product.

11. A process for producing a linear oligopeptide of the formula

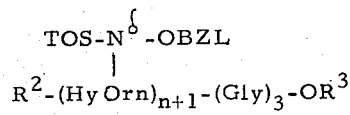

wherein

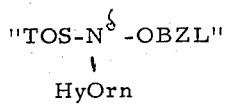

represents the group

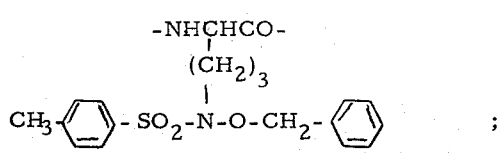

"Gly" represents a glycine residual group; $R^2$ is selected from the group consisting of hydrogen and a protecting group for the amino group selected from the group consisting of the acyl groups t-butyloxycarbonyl, p-methoxybenzyloxycarbonyl and carbobenzoxy; $R^3$ is selected from the group consisting of hydrogen and a protecting group for the carboxyl group selected from the group consisting of alkyl groups methyl and ethyl; and $n$ is an integer of 0 to 2, inclusive; and the acid addition salt thereof, which comprises coupling at a temperature of from 0°C to about room temperature an ornithyldiglycylglycine compound of the formula

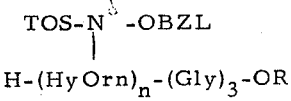

wherein

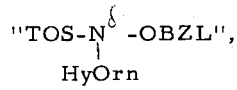

"Gly" and n are as defined above, and R represents a protecting group for the carboxyl group selected from the group consisting of alkyl groups sensitive to bases such as methyl and ethyl, with an ornithine derivative of the formula

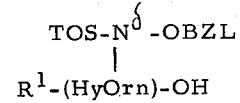

wherein

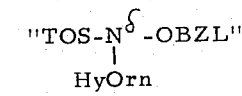

is as defined above and $R^1$ represents a protecting group for the amino group selected from the group consisting of acyl groups t-butyloxycarbonyl, p-methoxybenzyloxycarbonyl, and carbobenzoxy using as a coupling agent dicyclohexylcarbodiimide plus N-hydroxysuccinimide or Woodward Reagent K and, if desired, removing the protecting group from the resulting product.

12. A process for producing a linear oligopeptide of the formula

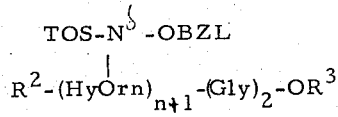

wherein

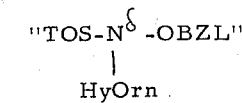

represents the group

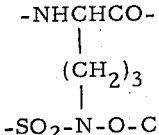

"Gly" represents a glycine residual group; $R^2$ is selected from the group consisting of hydrogen and a protecting group for the amino group selected from the group consisting of acyl groups t-butyloxycarbonyl, p-methoxybenzyloxycarbonyl and carbobenzoxy; $R^3$ is selected from the group consisting of hydrogen and a protecting group for the carboxyl group selected from the group consisting of alkyl groups methyl and ethyl; and n is an integer of 0 and 2, inclusive; and the acid addition salt thereof, which comprises coupling at a temperature of from 0°C to about room temperature a glycylglycine compound of the formula

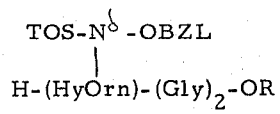

wherein

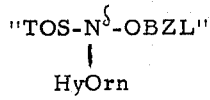

and "Gly" are as defined above, and R represents a protecting group for the carboxyl group selected from the group consisting of alkyl groups methyl and ethyl, with an ornithine derivative of the formula

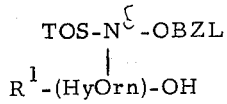

wherein

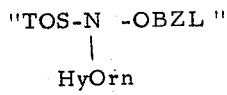

is as defined above and $R^1$ represents a protecting group for the amino group selected from the group consisting of acyl groups t-butyloxycarbonyl, p-methoxybenzyloxycarbonyl and carbobenzoxy, using a coupling agent dicyclohexylcarbodiimide plus N-hydroxysuccinimide or Woodward Reagent K, and, if desired, removing the protecting group from the resulting product.

13. A process for producing a linear oligopeptide of the formula

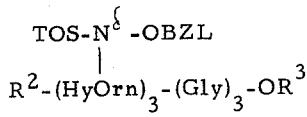

wherein

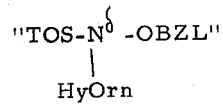

represents the group

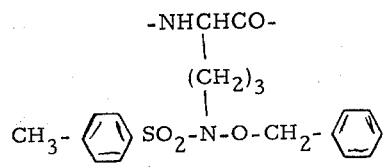

"Gly" represents a glycine residual group; $R^2$ is selected from the group consisting of hydrogen and a protecting group for the amino group selected from the group consisting of acyl groups t-butyloxycarbonyl, p-methoxybenzylcarbonyl and carbobenzoxy $R^3$ is selected from the group consisting of hydrogen and a protecting group for the carboxyl group selected from the group consisting of alkyl groups methyl and ethyl; and the acid addition salt thereof, which comprises couplng at a temperature of from 0°C to about room temperature a diglycylglycine ester of the formula

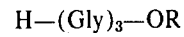

wherein "Gly" is as defined above and $R^1$ represents a protecting group for the carboxyl group selected from the group consisting of alkyl groups methyl and ethyl, with an ornithine compound of the formula

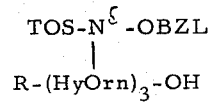

wherein R represents a protecting group for the amino group selected from the group consisting of acyl groups t-butyloxycarbonyl, p-methoxybenzyloxycarbonyl and carbobenzoxy, using as a coupling agent dicyclohexycarbodiimide plus N-hydroxysuccinimide or Woodward Reagent K, and, if desired, removing the protecting group for the amino group from the resulting product.

14. A process according to claim 10, wherein said coupling is carried out in an inert solvent in the presence of a neutralizing agent selected from N-methylmorpholine or triethylamine.

15. A process according to claim 11, wherein said coupling is carried out in an inert solvent.

16. A process according to claim 12, wherein said coupling is carried out in an inert solvent in the presence of a neutralizing agent selected from N-methylmorpholine or triethylamine.

17. A process according to claim 13, wherein said coupling is carried out in an inert solvent.

* * * * *

UNITED STATES PATENT OFFICE
CERTIFICATE OF CORRECTION

PATENT NO. : 3,862,110
DATED : January 21, 1975
INVENTOR(S) : Yoshikazu ISOWA et al It is certified that error appears in the above-identified patent and that said Letters Patent are hereby corrected as shown below:

IN THE HEADING:

Fourth Inventor's First Name - "Mideaki" should be -- Hideaki --

Signed and sealed this 6th day of May 1975.

(SEAL)
Attest:

RUTH C. MASON
Attesting Officer

C. MARSHALL DANN
Commissioner of Patents
and Trademarks